United States Patent
Walker et al.

(10) Patent No.: US 8,737,470 B2
(45) Date of Patent: *May 27, 2014

(54) POWER SAVINGS IN HIERARCHICALLY CODED MODULATION

(75) Inventors: Gordon Kent Walker, Poway, CA (US); Rajiv Vijayan, San Diego, CA (US); Seong Taek Chung, Redwood City, CA (US); Murali Ramaswamy Chari, San Diego, CA (US); Fuyun Ling, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 388 days.

This patent is subject to a terminal disclaimer.

(21) Appl. No.: 12/777,540

(22) Filed: May 11, 2010

(65) Prior Publication Data
US 2010/0220816 A1 Sep. 2, 2010

Related U.S. Application Data

(63) Continuation of application No. 11/096,320, filed on Mar. 31, 2005, now Pat. No. 7,725,799.

(51) Int. Cl.
*H04B 1/66* (2006.01)
*H04N 11/02* (2006.01)
*H04N 11/04* (2006.01)
*H04N 7/12* (2006.01)

(52) U.S. Cl.
USPC .............................. 375/240.12; 375/240.16

(58) Field of Classification Search
USPC ....................... 375/240.12, 240.16
See application file for complete search history.

(56) References Cited

U.S. PATENT DOCUMENTS

| | | | | |
|---|---|---|---|---|
| 3,983,541 | A * | 9/1976 | Faber et al. | 712/247 |
| 4,409,665 | A * | 10/1983 | Tubbs | 713/321 |
| 4,615,005 | A * | 9/1986 | Maejima et al. | 713/601 |
| 5,345,517 | A * | 9/1994 | Katayama et al. | 382/299 |
| 5,418,571 | A * | 5/1995 | Ghanbari | 375/240.16 |
| 5,486,876 | A * | 1/1996 | Lew et al. | 348/719 |
| 5,515,377 | A * | 5/1996 | Horne et al. | 370/395.64 |
| 5,586,200 | A * | 12/1996 | Devaney et al. | 382/232 |

(Continued)

FOREIGN PATENT DOCUMENTS

| | | | |
|---|---|---|---|
| GB | 2390513 A | * | 1/2004 |
| WO | 03024048 | | 3/2003 |
| WO | 2004105337 | | 12/2004 |

OTHER PUBLICATIONS

International Search Report—PCT/US06/012178, International Search Authority—European Patent Office Aug. 21, 2006.

(Continued)

*Primary Examiner* — Joseph D Torres
(74) *Attorney, Agent, or Firm* — Fulbright & Jaworski LLP

(57) ABSTRACT

A wireless communication apparatus in a hierarchically coded modulation system can use error control mechanisms generated during decoding of base layer information to predict a probability of successful demodulation of enhancement layer information. Performance in the demodulation of the base layer correlates to performance in the demodulation of the enhancement layer. The receiver can determine whether to attempt demodulation of temporally correlated enhancement layer data based in part on the predicted probability of success. If the receiver determines not to demodulate the enhancement layer, the receiver can power down the enhancement layer demodulator, or otherwise minimize the power expended in the enhancement layer demodulator.

18 Claims, 8 Drawing Sheets

(56) References Cited

U.S. PATENT DOCUMENTS

| | | | |
|---|---|---|---|
| 5,603,012 A * | 2/1997 | Sotheran | 712/208 |
| 5,621,660 A * | 4/1997 | Chaddha et al. | 709/247 |
| 5,742,892 A * | 4/1998 | Chaddha | 725/146 |
| 5,768,535 A * | 6/1998 | Chaddha et al. | 709/247 |
| 5,784,526 A * | 7/1998 | Shimoda et al. | 386/316 |
| 5,818,531 A * | 10/1998 | Yamaguchi et al. | 375/240.2 |
| 5,886,736 A * | 3/1999 | Chen | 348/43 |
| 5,966,412 A * | 10/1999 | Ramaswamy | 375/341 |
| 6,028,634 A * | 2/2000 | Yamaguchi et al. | 375/240.16 |
| 6,148,026 A * | 11/2000 | Puri et al. | 375/240 |
| 6,173,013 B1 * | 1/2001 | Suzuki et al. | 375/240.16 |
| 6,208,699 B1 * | 3/2001 | Chen et al. | 375/340 |
| 6,252,917 B1 * | 6/2001 | Freeman | 375/340 |
| 6,256,346 B1 * | 7/2001 | Yamaguchi et al. | 375/240.12 |
| 6,266,817 B1 * | 7/2001 | Chaddha | 725/146 |
| 6,282,233 B1 * | 8/2001 | Yoshida | 375/148 |
| 6,289,485 B1 * | 9/2001 | Shiomoto | 714/779 |
| 6,321,073 B1 * | 11/2001 | Luz et al. | 455/239.1 |
| 6,363,119 B1 * | 3/2002 | Oami | 375/240.03 |
| 6,501,797 B1 * | 12/2002 | van der Schaar et al. | 375/240.12 |
| 6,519,285 B2 * | 2/2003 | Yamaguchi et al. | 375/240.12 |
| 6,535,559 B2 * | 3/2003 | Yagasaki et al. | 375/240.12 |
| 6,553,072 B1 * | 4/2003 | Chiang et al. | 375/240.25 |
| 6,603,883 B1 * | 8/2003 | Hamanaka | 382/239 |
| 6,643,328 B2 * | 11/2003 | Yagasaki et al. | 375/240.12 |
| 6,694,477 B1 * | 2/2004 | Lee | 714/784 |
| 6,700,933 B1 * | 3/2004 | Wu et al. | 375/240.16 |
| 6,707,949 B2 * | 3/2004 | Haskell et al. | 382/243 |
| 6,798,838 B1 * | 9/2004 | Ngo | 375/240.19 |
| 6,876,623 B1 * | 4/2005 | Lou et al. | 370/208 |
| 6,909,753 B2 * | 6/2005 | Meehan et al. | 375/240.27 |
| 6,920,179 B1 * | 7/2005 | Anand et al. | 375/240.26 |
| 6,980,667 B2 * | 12/2005 | Hamanaka | 382/239 |
| 6,999,432 B2 * | 2/2006 | Zhang et al. | 370/328 |
| 7,016,296 B2 * | 3/2006 | Hartman, Jr. | 370/204 |
| 7,206,345 B2 * | 4/2007 | Barrau et al. | 375/240.1 |
| 7,263,124 B2 * | 8/2007 | Peng et al. | 375/240.03 |
| 7,411,522 B2 * | 8/2008 | Yamanashi et al. | 341/50 |
| 7,453,900 B2 | 11/2008 | Robinson et al. | |
| 7,620,545 B2 * | 11/2009 | Chiu et al. | 704/229 |
| 7,725,799 B2 | 5/2010 | Walker et al. | |
| 7,899,059 B2 * | 3/2011 | Ramprashad | 370/395.42 |
| 2002/0181604 A1 | 12/2002 | Chen | |
| 2006/0039469 A1 * | 2/2006 | Leibbrandt | 375/240.08 |
| 2006/0193379 A1 * | 8/2006 | Ridge et al. | 375/240.01 |
| 2009/0316835 A1 | 12/2009 | Walker et al. | |

OTHER PUBLICATIONS

Written Opinion—PCT/US06/012178, International Search Authority—European Patent Office Aug. 21, 2006.

* cited by examiner

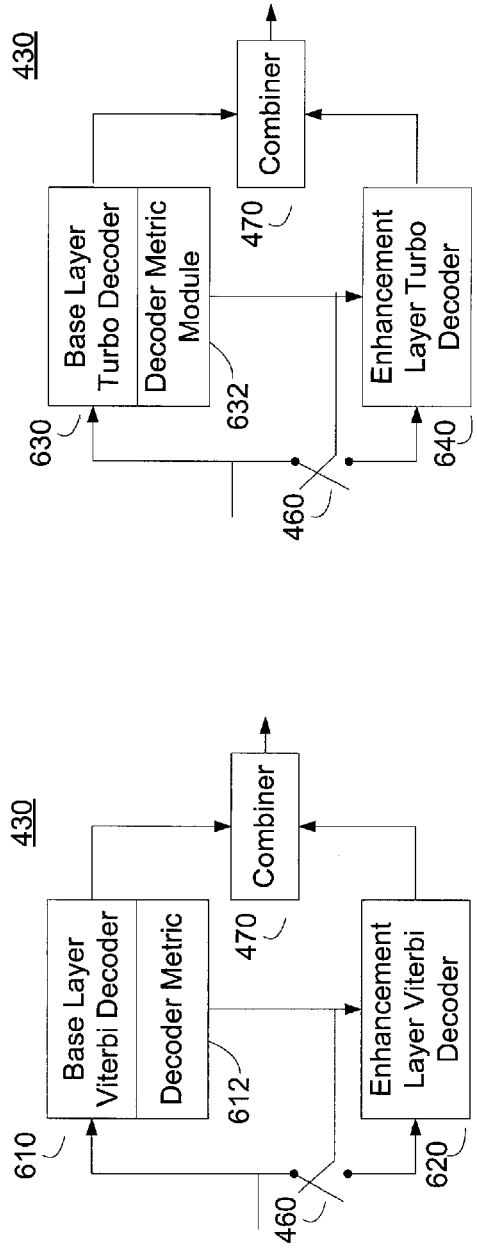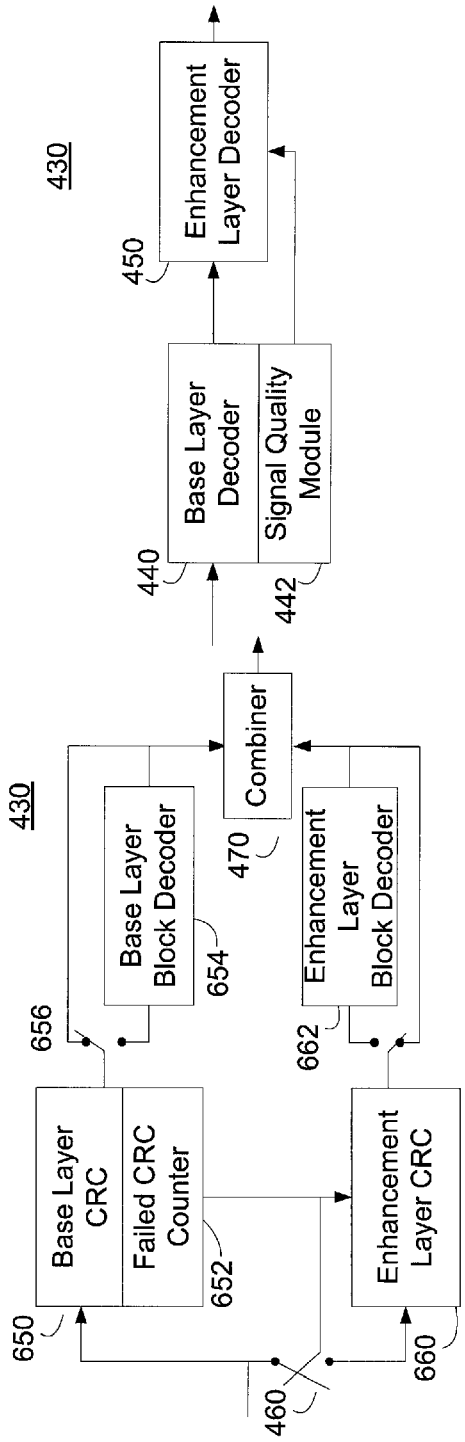

POWER SAVINGS IN HIERARCHICALLY CODED MODULATION

CROSS-REFERENCE TO RELATED APPLICATION

This application is a continuation of U.S. patent application Ser. No. 11/096,320, filed Mar. 31, 2005 which is incorporated herein by reference in their entirety.

BACKGROUND OF THE DISCLOSURE

1. Field of the Disclosure

The disclosure relates to the field of wireless communications. More particularly, the disclosure relates to power saving methods and apparatus for use in hierarchically coded modulation systems.

2. Description of Related Art

Wireless communication systems are continually striving to increase the data bandwidth so that information can quickly be exchanged between devices coupled to the communication system. Some of the parameters that limit the data bandwidth available to devices include the spectral bandwidth allocated to the devices and the quality of the channel linking the devices.

The spectral bandwidth allocated to communications in a wireless communication system typically is predetermined and does not vary. However, the quality of the channel may vary considerably for wireless communication devices. In wireless communication systems where at least one of the devices of a communication link is a mobile device, the channel quality can vary based on the relative positions of the devices.

The placement of objects and occlusions, and variations in the terrain between the devices can contribute to multipath effects that substantially degrade the channel quality. The distance between the communicating devices introduces signal attenuation that must be taken into account.

Wireless communication systems compensate for the various constraints on data bandwidth using a variety of techniques. A wireless communication system may incorporate multiple encoding techniques, and may select an encoding technique based on a data rate supported by a channel. In such a system, the communicating devices may negotiate a data rate based on the capabilities of the channel. Such a communication system may be advantageous for multiple point to point links, but may be less than ideal in a distributed broadcast system where a single transmitter provides substantially the same data to multiple receivers.

Other wireless communication system may incorporate hierarchical modulation, where multiple data streams are simultaneously transmitted. The multiple data streams can include a base layer that is a robust communication link capable of successful reception in nearly all receiver operating conditions. The multiple data streams can also include an enhancement layer that is broadcast at a data rate that is lower, the same, or higher than the data rate of the base layer. The communications over the enhancement layer may require a higher signal quality at the receiver compared to the base layer. Therefore, the enhancement layer may be more sensitive to variations in the quality of the channel.

In a hierarchical modulation system, the receiver is typically ensured the ability to communicate at the base level, and can typically demodulate data on the base layer. In channel conditions sufficient to support the enhancement layer, the receiver is also able to demodulate additional data modulated on the enhancement layer.

Regardless of the manner in which the wireless communication system transmits its data, a mobile device operating within the system typically operates from battery power. A mobile terminal can only maintain communications with another device if it has sufficient battery power to receive and demodulate received signals, and modulate and broadcast transmit signals.

BRIEF SUMMARY OF THE DISCLOSURE

An apparatus in an hierarchically coded modulation system can use error control mechanisms generated during decoding of base layer information to predict a probability of successful demodulation of enhancement layer information. Poor performance in the demodulation of the base layer correlates to poor performance in the demodulation of the enhancement layer. The receiver can determine whether to attempt demodulation of temporally correlated enhancement layer data based in part on the predicted probability of success. If the receiver determines not to demodulate the enhancement layer, the receiver can power down the enhancement layer demodulator, or otherwise minimize the power expended in the enhancement layer demodulator.

The disclosure includes a method of controlling a data decoder, including receiving a hierarchically coded signal having base layer data and enhancement layer data, decoding base layer data from the hierarchically coded signal, determining a signal quality metric based at least in part on decoding the base layer data, and controlling an enhancement layer decoder based on the signal quality metric.

The disclosure also includes a method of controlling a data decoder, including receiving a hierarchically coded signal having base layer data and enhancement layer data, decoding base layer data from the hierarchically coded signal using a base layer decoder, determining a signal quality metric based in part on an error control mechanism of the base layer decoder, comparing the signal quality metric against a predetermined threshold, and inhibiting an enhancement layer decoder to control decoding of enhancement layer data if the signal quality metric does not exceed the predetermined threshold.

The disclosure also includes an apparatus for decoding a hierarchically coded signal, including a receiver module configured to receive the hierarchically coded signal, a base layer decoder configured to decode a base layer data from the hierarchically coded signal, a signal quality module configured to determine a signal quality metric based in part on a decoding operation performed by the base layer decoder, and an enhancement layer decoder configured to selectively decode an enhancement layer data from the hierarchically coded signal based in part on the signal quality metric.

The disclosure also includes an apparatus for decoding a hierarchically coded signal, including a receiver module configured to receive a hierarchically coded modulated signal, a demodulator configured to demodulate the hierarchically coded modulated signal to recover hierarchically coded symbols, a base layer decoder configured to decode a base layer data from the hierarchically coded symbols, a signal quality module configured to determine a signal quality metric based in part on a decoding operation performed by the base layer decoder, and an enhancement layer decoder configured to selectively inhibit decoding of an enhancement layer data temporally correlated to the base layer data based in part on the signal quality metric.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

FIGS. 6A-6D are functional block diagrams of hierarchical decoder embodiments implementing power savings.

DETAILED DESCRIPTION OF THE DISCLOSURE

Figure 1:
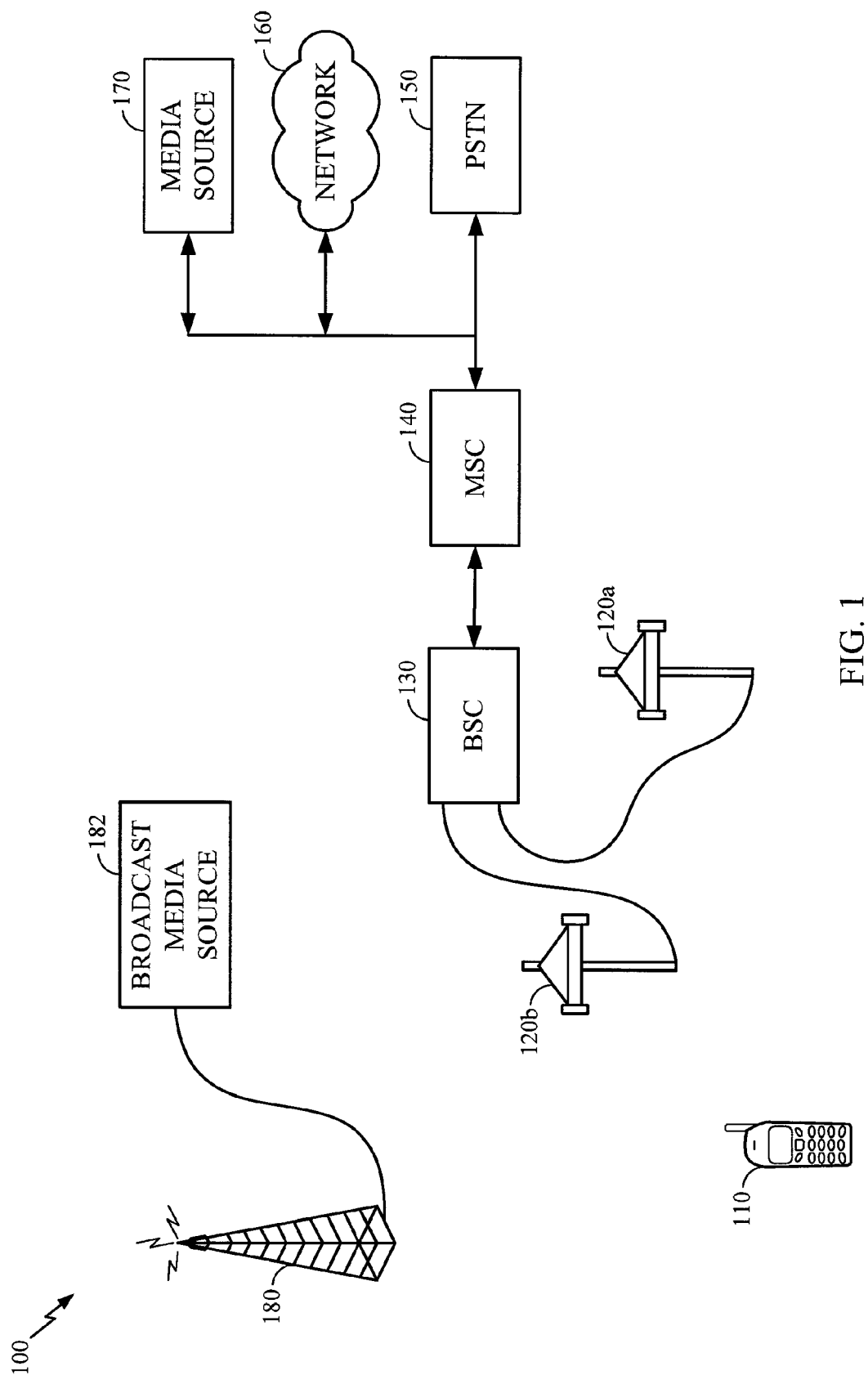
FIG. 1 is a functional block diagram of an embodiment of a wireless communication system incorporating hierarchical modulation and power savings in the user terminal.

A receiver in a communication system implementing hierarchical modulation can conserve power by selectively decoding an enhancement layer based on the quality of the base layer signal. The receiver can be configured to continually decode the base layer and use the error rate metric generated during decoding of the base layer to determine, or otherwise predict, a probability of successfully decoding the enhancement layer. The receiver can then determine whether to decode the enhancement layer based in part on the probability of successful decoding. If the probability of successfully decoding the enhancement layer is less than a predetermined threshold, the receiver can drop received enhancement layer information without attempting to decode it. The predetermined threshold may be a fixed threshold, but may also be a variable or adaptive threshold. A variable threshold can be adjusted, for example, based on an error rate of previously decoded enhancement layer information or based on a type, category, or classification of information being received. For example, a receiver receiving streaming video may operate satisfactorily with a higher bit error rate than the same receiver receiving executable program code. Thus, a threshold may be determined based on the content being received.

The user may also be given the option of adjusting the threshold or disabling the enhancement layer entirely. By dropping the information, the receiver conserves the energy that would normally be expended during the course of decoding. Based on the low probability of success, the enhancement layer decoding is likely to be unsuccessful, resulting in the recovery of no data even if the decoding operation is attempted. Therefore, the receiver operates to conserve power in a manner that results in effectively no loss in throughput.

The receiver may also be configured to inhibit decoding of some other temporally correlated enhancement layer information, based on the low probability of successfully decoding the enhancement layer. For example, the receiver can be configured to inhibit decoding of a predetermined number or duration of future received enhancement layer information, based on a determination of a low probability of successful decoding. Therefore, the receiver may inhibit decoding of a predetermined number of packets of enhancement layer information, such as a frame or super frame of data, or some other data size.

The receiver can implement an error control mechanism based on the type of decoder implemented within the receiver, which can be, in part determined based on the type of encoding used in the communication system. For example, in one embodiment the wireless communication system may use a convolutional encoder to encode the base layer data and the receiver can implement a Viterbi decoder. In such an embodiment, the receiver can use the number or rate of error corrections performed by the Viterbi decoder as an indicator of the probability of successful decoding of the enhancement layer. The receiver can compare the number or rate of error corrections against a predetermined threshold to determine if the decode operation should be performed on the enhancement layer. Alternatively, the receiver can set a threshold for a signal quality metric based on the power ratio of the enhancement layer relative to the base layer. The receiver can determine whether to decode the enhancement layer based on a comparison of the signal quality metric to the threshold.

In another embodiment, the system may implement a turbo encoder to encode the base layer, and the receiver can be configured to implement a corresponding turbo decoder to decode the received base layer. In one embodiment, the receiver may determine an energy metric based on the output of the turbo decoder by multiplying each of the decoded bits by a corresponding Log Likelihood Ratio (LLR). In the above computation, each decoded output bit can be multiplied by a term that corresponds to the LLR computed for the corresponding (systematic) input bit into the turbo encoder. The receiver can then determine the energy metric as a sum of a predetermined number of scaled decoded bits. The receiver can then compare the energy metric against a predetermined threshold to determine a likelihood of decoding the enhancement layer.

In another embodiment, the receiver can determine an uncoded Bit Error Rate based on the output of the turbo decoder. The receiver can determine the uncoded Bit Error Rate, for example, by multiplying each of the decoded bits with the sign bit of the corresponding LLR. The receiver can then determine the uncoded Bit Error Rate as a sum of a predetermined number of scaled decoded bits. The receiver can compare the uncoded Bit Error Rate against a predetermined threshold to determine the likelihood of decoding the enhancement layer.

The receiver may also implement a counter that tracks the number of times that the decode operation is performed on received base layer information in order to achieve a successful decode. The number of decoder cycles required by the turbo decoder to achieve a successful decode can be compared against a predetermined threshold, and the results used to determine if the decode operation is to be performed on the enhancement layer. As before, the receiver can set a threshold based on the power ratio of the enhancement layer relative to the base layer, and decode the enhancement layer if the ratio is not less than the predetermined threshold.

In another embodiment where the receiver is configured to implement a turbo decoder, the receiver can generate an estimate of Bit Error Rate (BER) by comparing the source bits against the decoded bits. The receiver can then inhibit the enhancement layer decoder if the BER exceeds a predetermined threshold.

In still another embodiment, the system may encode the base layer using a cyclic redundancy code (CRC) that is appended to a predetermined length of data. The receiver can use the CRC to validate the encoded base layer data. The receiver may use a failed CRC, or a predetermined number or rate of failed CRCs, as an indication of a low probability of successful decoding of the enhancement layer.

In still another embodiment where the system block encodes the base layer data in addition to appending CRC data, the receiver can use statistics relating to error correction with the block encoding to determine the probability of successful enhancement layer decoding. The base layer data can be organized as a number of rows of data. Each of the columns can be block coded and Forward Error Correction (FEC) parity data appended to each column. A CRC value can then be determined and appended to each row. The receiver can determine that there is a low probability of successfully decoding the enhancement layer data if the receiver is required to block decode the columns in order to recover the base layer data.

In still another embodiment, the receiver can determine a likelihood of recovering the enhancement layer information prior to, or distinct from, a decoder operation. In one embodiment, the receiver can determine a likelihood of recovering the enhancement layer data based on the demodulated data. For example, the receiver can determine a ratio of in-phase to quadrature signal power. The receiver can compare the ratio to a predetermined threshold or window and determine a likelihood of recovering the enhancement layer data based on the comparison. In another embodiment, the receiver can scale the demodulated symbols by a channel estimate and determine a likelihood of recovering the enhancement layer data based on a magnitude of the scaled in-phase or quadrature symbols.

The type of encoding and the decoder implemented in the receiver are not described as limitations, but instead, are described as examples to illustrate a number of possible embodiments. Further embodiments are provided in the following detailed description.

FIG. 1 is a functional block diagram of an embodiment of a wireless communication system 100 incorporating hierarchical modulation and power savings in the user terminal. The system includes one or more fixed elements that can be in communication with a user terminal 110. The user terminal 110 can be, for example, a wireless telephone configured to operate according to one or more communication standards using hierarchical coded modulation.

The user terminal 110 can be a portable unit, a mobile unit, or, a stationary unit. The user terminal 110 may also be referred to as a mobile unit, a mobile terminal, a mobile station, user equipment, a portable, a phone, and the like. Although only a single user terminal 110 is shown in FIG. 1, it is understood that a typical wireless communication system 100 has the ability to communicate with multiple user terminals 110.

The user terminal 110 typically communicates with one or more base stations 120a or 120b, here depicted as sectored cellular towers. The user terminal 110 will typically communicate with the base station, for example 120b, that provides the strongest signal strength at a receiver within the user terminal 110.

Each of the base stations 120a and 120b can be coupled to a Base Station Controller (BSC) 140 that routes the communication signals to and from the appropriate base stations 120a and 120b. The BSC 140 is coupled to a Mobile Switching Center (MSC) 150 that can be configured to operate as an interface between the user terminal 110 and a Public Switched Telephone Network (PSTN) 150. The MSC can also be configured to operate as an interface between the user terminal 110 and a network 160. The network 160 can be, for example, a Local Area Network (LAN) or a Wide Area Network (WAN). In one embodiment, the network 160 includes the Internet. Therefore, the MSC 150 is coupled to the PSTN 150 and network 160. The MSC 150 can also be coupled to one or more media source 170. The media source 170 can be, for example, a library of media offered by a system provider that can be accessed by the user terminal 110. For example, the system provider may provide video or some other form of media that can be accessed on demand by the user terminal 110. The MSC 150 can also be configured to coordinate inter-system handoffs with other communication systems (not shown).

The base stations 120a and 120b can be configured to transmit hierarchically coded signals to the user terminal 110. For example, the base stations 120a and 120b can be configured to transmit a multicast signal that can be directed to the user terminal 110 as well as other receivers (not shown). The hierarchical coded signals can include a base layer signal that is configured to be robust, and an enhancement layer signal that operates at a lower link margin, and as a result, that is more sensitive to variations in the channel. The enhancement layer can be configured to provide supplemental data to the data supplied on the base layer or provide independent data that has a lower quality of service requirement.

The wireless communication system 100 can also include a broadcast transmitter 180 that is configured to transmit a modulated hierarchically coded signal to the user terminal 110. In one embodiment, the broadcast transmitter 180 can be associated with the base stations 120a and 120b. In another embodiment, the broadcast transmitter 180 can be distinct from, and independent of, the wireless telephone system containing the base stations 120a and 120b. The broadcast transmitter 180 can be, but is not limited to, an audio transmitter, a video transmitter, a radio transmitter, a television transmitter, and the like or some combination of transmitters.

The broadcast transmitter 180 can be configured to receive data from a broadcast media source 182 and can be configured to hierarchically code the data, modulate a signal based on the hierarchically coded data, and broadcast the modulated hierarchically coded data to a service area where it can be received by the user terminal 110. The broadcast transmitter 180 can generate, for example, base layer data and enhancement layer data from data received from the broadcast media source 182.

The hierarchical coded data configuration can be advantageous because the enhancement layer does not carry data that is redundant to that carried on the base layer. Additionally, the inability of the receiver to decode the enhancement layer may not result in loss of service. For example, the base layer can be configured to deliver video at a standard video resolution, and the enhancement layer can provide additional data that increases the resolution or SNR of the received video signal. In such a configuration, the inability to decode the enhancement layer data results in lower resolution signal or SNR but not a complete loss of signal.

The user terminal 110 can be configured to demodulate the received signal and decode the base layer. The receiver in the user terminal 110 can implement error control mechanisms as a standard part of the base layer decoder. The receiver in the user terminal 110 can use the error control mechanisms of the base layer decoder to determine a probability of successful enhancement layer decoding. The receiver in the user terminal 110 can then determine whether to decode the enhancement layer based on statistics or metrics generated in the error control mechanisms used in the base layer decoding.

Figure 2C:
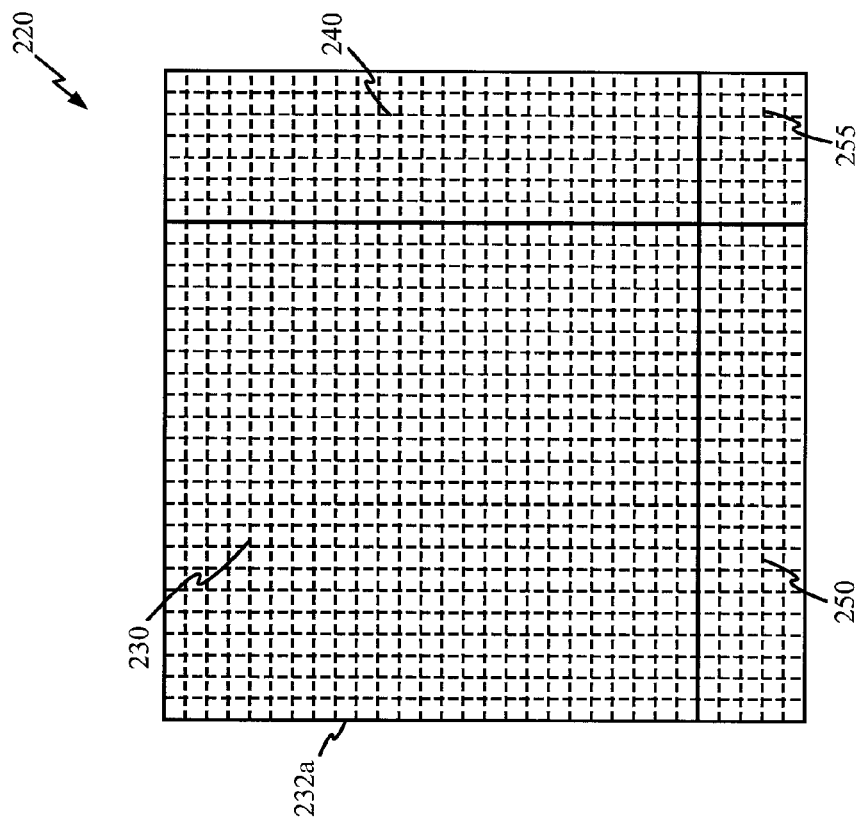
FIG. 2C is a block diagram of an embodiment of a block coding technique that can be used with hierarchical coded modulation.
Figure 2A:
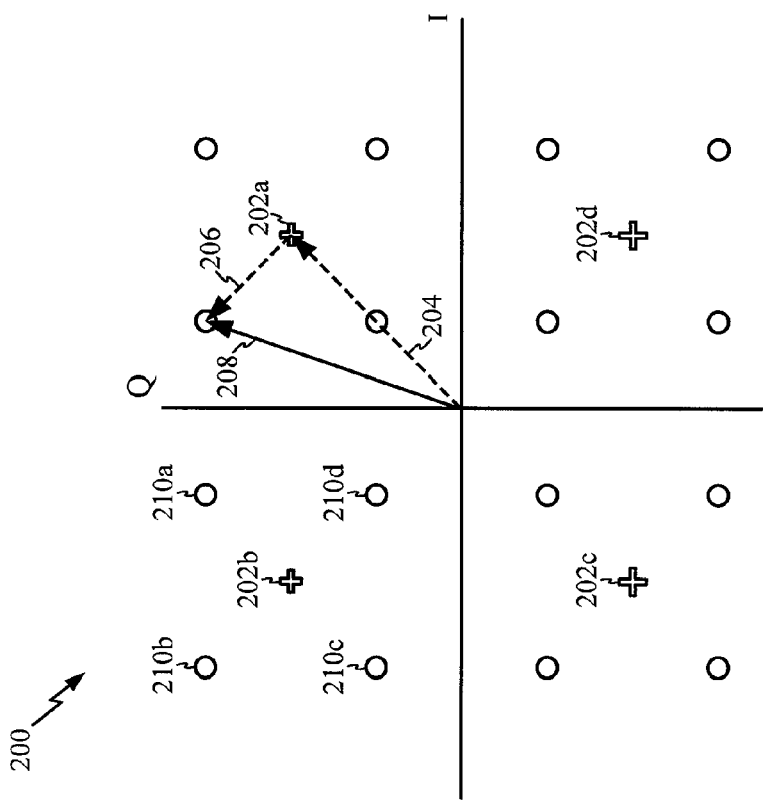
FIGS. 2A-2B are constellation diagrams of hierarchical modulation techniques.

FIG. 2A is a constellation diagram 200 of an embodiment of a hierarchical modulation implementation. As an example, the wireless communication system 100 of FIG. 1 may implement hierarchical modulation in the manner shown in FIG. 2A. The hierarchical modulation implementation can be referred to as Quadrature Phase Shift Keying (QPSK) on QPSK. The implementation includes a QPSK modulated base layer. Although a QPSK on QPSK hierarchical modulation implementation is illustrated in FIG. 2A, the power saving apparatus and methods disclosed herein are not limited to any particular type of hierarchical modulation. For example, other hierarchical modulation embodiments may use 16-QAM over QPSK, or some other form of hierarchical modulation.

The QPSK base layer is defined by four constellation points 202a-202d. The enhancement layer is also QPSK modulated. However, the QPSK modulated enhancement layer occurs on top of the QPSK base layer constellation. The QPSK constellation for the enhancement layer includes four positions, but the constellation can be centered about any of the four constellation points 202a-202d of the base layer.

As an example, a second base layer constellation point 202b occurs in the second quadrant, where the I signal component is negative and the Q signal component is positive. On top of the second base layer constellation point 202b are four constellation points 210a-210d of the enhancement layer. Similarly, each quadrant, corresponding to a constellation point 202a-202d of the base layer, has four constellation points of the enhancement layer.

The hierarchical modulation can be viewed as a sum of a vector for the base layer with a vector from the enhancement layer. The sum of vectors corresponding to base layer and enhancement layer data is illustrated in an example appearing in the first quadrant. A first vector 204 corresponds to an instance of base layer data. The position of first vector 204 defines the origin for the enhancement layer data. A second vector 206 corresponding to the enhancement layer data is summed with the first vector 204 of the base layer. The resultant vector 208 represents the hierarchical modulated data.

In another embodiment, the vector sum can be a sum after rotating the signal constellation of the enhancement layer based on the base layer signal constellation. For example, the constellation for the enhancement layer data can be rotated by the angle of the base layer vector, and the rotated enhancement layer vector summed with the base layer vector. In another embodiment, the constellation of the enhancement layer can be rotated a predetermined amount based on a position of the base layer data in the base layer constellation. For example, in the QPSK on QPSK embodiment, the enhancement layer constellation can be rotated in integer increments of 90 degrees, based on the quadrant of the base layer constellation. In still another embodiment, the enhancement layer constellation can be mirrored based on its position in the base layer constellation. Some constellation embodiments may use a combination of rotation and mirroring.

In yet another embodiment, the base and enhancement layer data can be mapped to a constellation symbol based on a predetermined map or algorithm. For example, the base layer data and enhancement layer data can each include two bits, such that the combination of the base layer and enhancement layer data is four bits The mapping operation can take the four bits and map them to a symbol from a predetermined constellation, such as a QAM constellation or a QPSK on QPSK constellation.

Figure 2B:
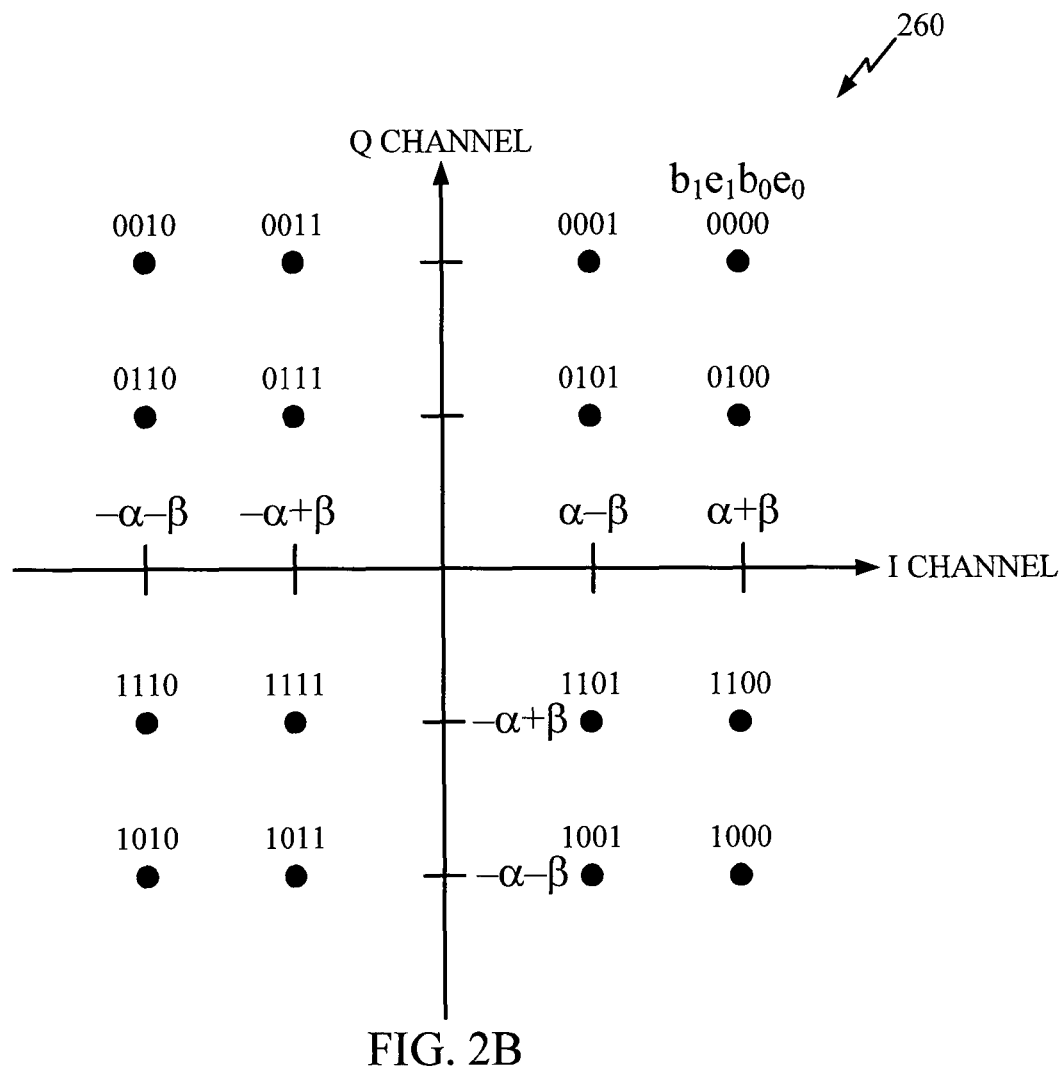

FIG. 2B is a constellation diagram 260 of another embodiment of a hierarchical modulation implementation. The constellation diagram 260 of FIG. 2B is a 16-QAM constellation in which the base layer data maps to a particular quadrant of the constellation, and the enhancement layer data maps to the particular position within the constellation. The 16-QAM constellation 260 does not need to be consistently spaced, but may be modified to have a consistent spacing within each quadrant and a distinct spacing between the nearest points within different quadrants. Furthermore, some of the points in the constellation may be mirrored with respect to a midpoint in the quadrant.

The underlying data defining the respective quadrants of the base and enhancement layers can be encoded using one or more encoding processes. The encoding process used can be any encoding process, and the type of encoding is not a limitation on the power saving apparatus and methods disclosed herein. The encoder can include, for example, a convolutional encoder, a turbo encoder, a block encoder, an interleaver, a CRC encoder, a combination of encoders, and the like, or some other process or apparatus for encoding data.

FIG. 2C is a block diagram of an embodiment of a block coding structure 220 that can be used with hierarchical coded modulation. The block coding structure 220 implements a systematic code structure appended by a block coding portion.

The block coding structure 220 includes a number of rows of data 230 arranged in a block. The rows of data 230 can be interleaved, but need not be. Each row, for example 232a, from the rows of data 230 is processed to produce a CRC value that is appended to the row. Thus, the block coding structure 220 includes a CRC portion 240 that corresponds to the CRC values calculated for each of the rows. Following the rows of data 230 is a block coding portion 250 that is determined from the rows of data 230 and CRC portion 240 in a vertical, column wise manner. Thus each column of data from the rows of data 230 generates a block code value that is appended to the column. Note that the CRC portion 240 itself corresponds to a CRC block coded portion 255 that includes block codes corresponding to the CRC values and none of the data. The block code values can be generated using any type of block coding technique, such as a Reed-Solomon block code.

In another embodiment of the block coding structure 220, the rows of data 230 can be arranged in a block. Block coding can be performed on each column of data to generate the block coding portion 250. A CRC value can be determined and appended to each row, including the rows in the block coding portion 250, to generate the CRC portion 240 and the CRC block coded portion 255.

The data can be read out of the block coding structure 220 in a row wise manner and used as the underlying base layer or enhancement layer data. In one embodiment, the base layer data is block encoded independently of the enhancement layer data. The block code structure 220 provides some decoding options that can speed decoding of data received over high quality channels.

The received encoded data can be decoded by examining the CRC for each received row. A valid CRC value indicates a high probability of successful receipt of the data, whereas a failed CRC can indicate errors in one or more locations of the received data 230. A receiver can determine, prior to receipt of the data from the block coded portion 250, if the previously received data was successfully decoded. If so, there is no reason to process the block coded portion 250. Alternatively, the receiver can determine that the received data was not successfully decoded, for example, based on a predetermined number of failed CRC validations. In such a situation, the receiver can process the block coded portion 250 to further decode the received data. The receiver processes the block coded portion 250 only if the previously received data was not successfully decoded.

Figure 3:
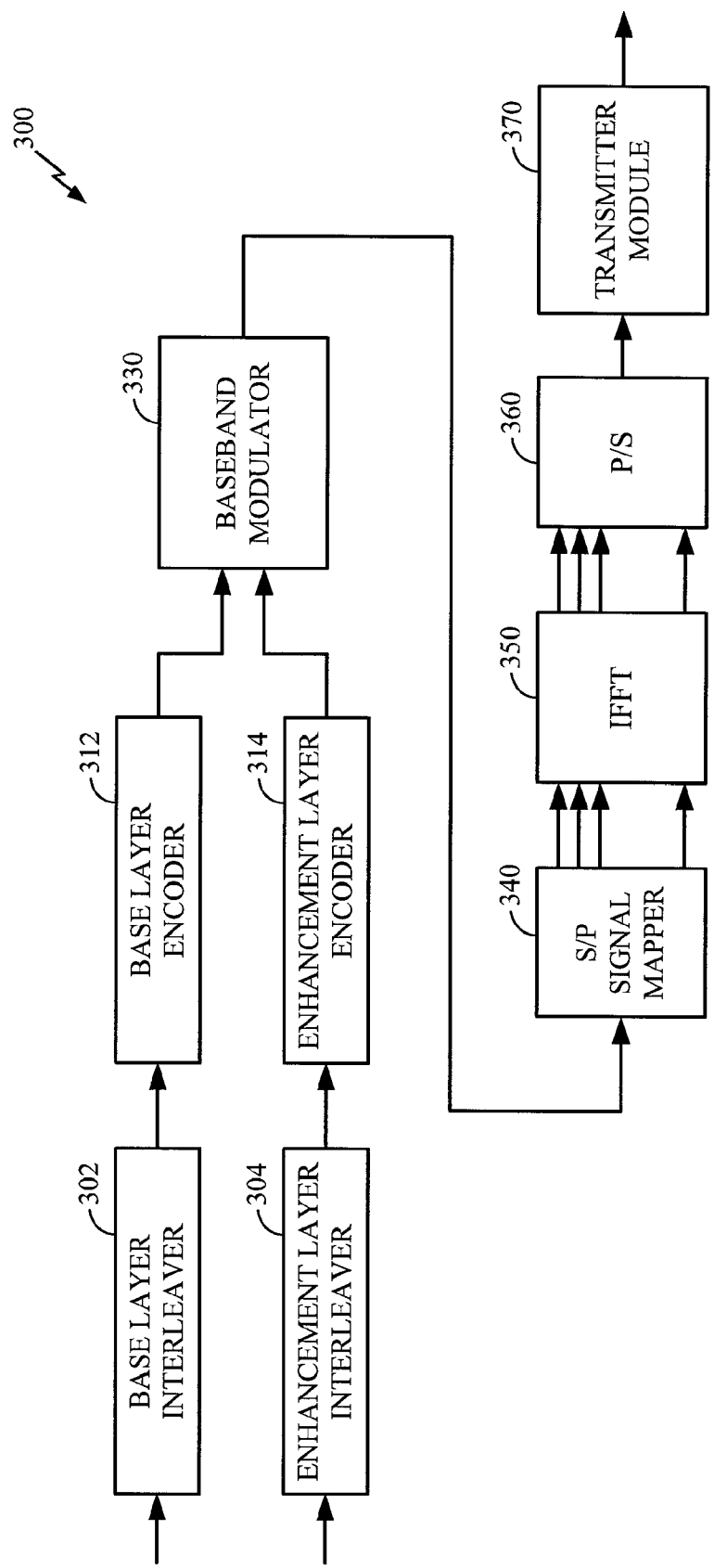
FIG. 3 is a functional block diagram of an embodiment of a transmitter in a hierarchical coded modulation system.

FIG. 3 is a functional block diagram of an embodiment of a transmitter 300 configured for a hierarchical coded modulation system. The transmitter 300 of FIG. 3 is configured for QPSK on QPSK hierarchical modulation in an Orthogonal Frequency Division Multiple Access (OFDMA) or Orthogonal Frequency Division Multiplex (OFDM) system. However, the transmitter 300 embodiment represents an embodiment and not a limitation on the disclosed power saving apparatus and methods. For example, a single carrier system can be modulated with hierarchically coded data.

The transmitter 300 includes a first data path that includes a base layer interleaver 302 configured to receive the base layer data, for example, from a data buffer, and interleave a predetermined block of data. The output of the base layer interleaver 302 is coupled to a base layer encoder 312. The base layer encoder 312 can encode the interleaved base layer data according to any of a variety of encoding techniques. For example, the base layer encoder 312 can be configured to convolutional code, turbo code, block code, or otherwise encode the interleaved base layer data to generate encoded base layer symbols. The output of the base layer encoder 312 is coupled to a first input of a baseband modulator 330. The base layer symbols can be configured as I and Q signal components of a QPSK signal.

The transmitter 300 also includes a second data path configured to process the enhancement layer data. The second data path is configured similar to the first data path. An enhancement layer interleaver 304 is configured to receive and interleave a block of enhancement layer data. The data may be stored in a data buffer or some other type of memory device (not shown).

The output of the enhancement layer interleaver 314 is coupled to an enhancement layer encoder 314. Typically, the enhancement layer encoder 314 implements the same type of encoder used for the base layer encoder 312, although such commonality is not a requirement. The output of the enhancement layer encoder 314 is coupled to a second input of the baseband modulator 330. The encoded symbols of the enhancement layer can be configured as I and Q signal components of a QPSK signal. The magnitude of the enhancement layer symbols can be adjusted to achieve the QPSK on QPSK constellation shown in FIG. 2A.

The baseband modulator 330 can be configured to combine the base layer symbols with the enhancement layer symbols to generate hierarchically coded symbols. The baseband modulator 330 can be configured to modulate a baseband signal with the hierarchically coded symbols. In some embodiments, the baseband modulator 330 can be omitted.

The output of the baseband modulator 330 can be coupled to a serial to parallel converter 340 that is configured as a signal mapper. The serial to parallel converter 340 can be configured to map the serial symbol stream to the carrier frequencies assigned to OFDMA symbols for a particular user terminal. In systems where the hierarchical coded symbol generation is performed for multiple user terminals, each of the user terminals may be assigned to a subset of the available carrier frequencies.

The output of the serial to parallel converter 340 is coupled to a transform module, such as an Inverse Fast Fourier Transform (IFFT) module 350. The IFFT module 350 is configured to transform the frequency domain symbols to their corresponding time domain samples. The output of the IFFT module 350 is coupled to a parallel to serial converter 360 that is used to generate a serial symbol stream from the parallel IFFT module 350 outputs. The output of the parallel to serial converter 360 is coupled to a wireless transmitter module 370 that is configured to frequency convert and transmit the OFDMA symbols.

Figure 4:
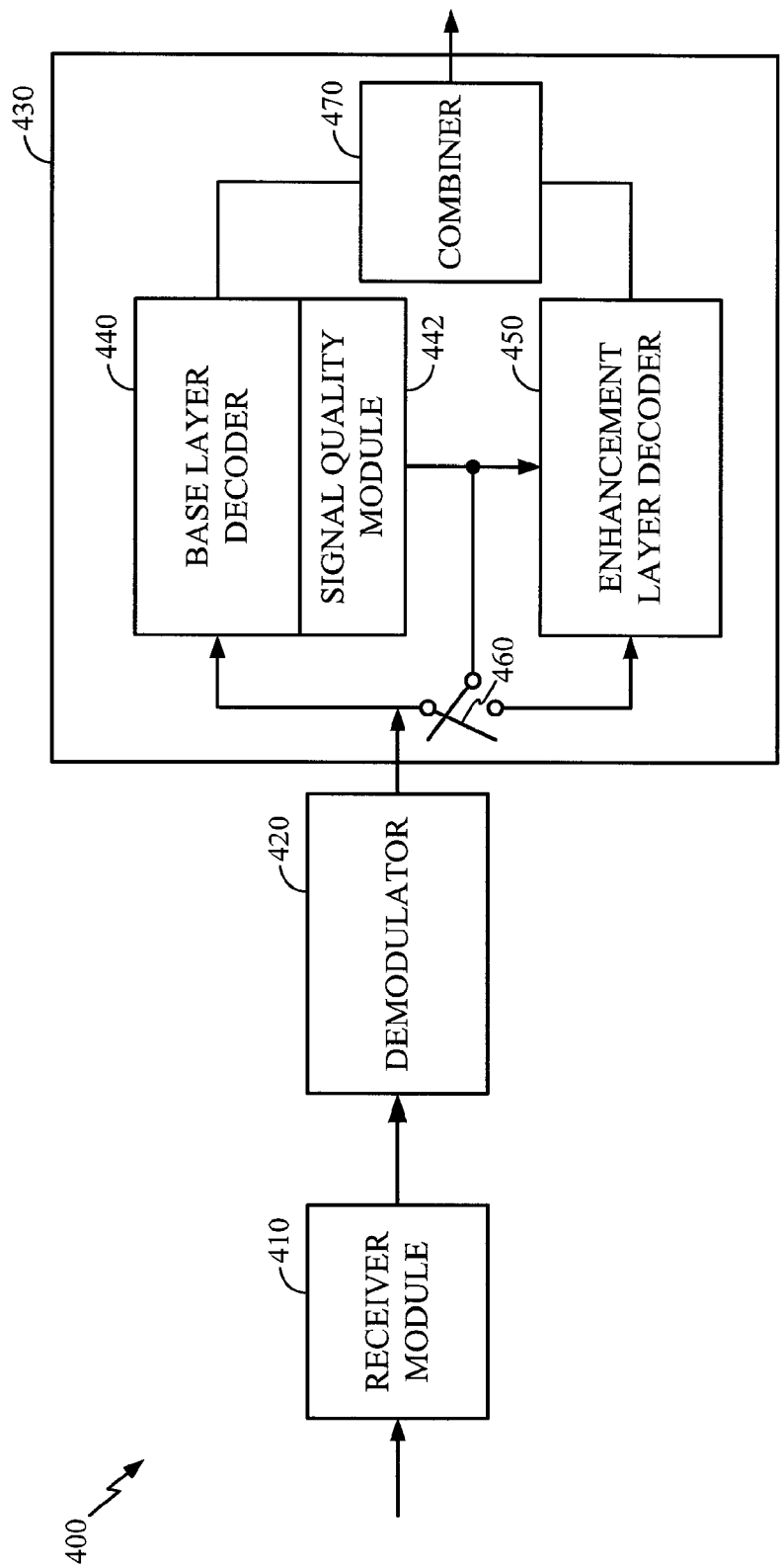
FIG. 4 is a functional block diagram of an embodiment of a receiver configured for operation in a hierarchical modulation system.

FIG. 4 is a functional block diagram of an embodiment of a receiver 400 configured for power savings in a hierarchically coded modulation communication system. The receiver 400 can be implemented, for example, in a user terminal operating in the wireless communication system of FIG. 1.

The receiver 400 includes a receiver module 410 configured to receive the hierarchically coded signals over, for example, a wireless link. The receiver module 410 can be configured to filter, amplify, and frequency convert the received signals. The output of the receiver module 410 can be, for example, a baseband signal.

The output of the receiver module 410 can be coupled to a demodulator 420 that can be configured to demodulate the received signals to generate the hierarchically coded symbols. The output of the demodulator 420 can be coupled to an input of a hierarchical decoder module 430. The input to the hierarchical decoder module 430 couples the hierarchically coded symbols to both a base layer decoder 440 and selectively to an enhancement layer decoder 450 through a switch 460.

The base layer decoder 440 can be configured to decode the received symbols to determine the received base layer data from the demodulated symbols. The base layer decoder 440 is coupled to a signal quality module 442 that is configured to monitor the base layer decoding process and determine a probability of successful enhancement layer decoding.

The signal quality module 442 can be, for example, part of an error control mechanism within the base layer decoder 440. The signal quality module 442 can determine the probability of successful enhancement layer decoding and can compare the probability against a predetermined threshold value. If the probability does not exceed the predetermined threshold, the signal quality module 442 can be configured to control the enhancement layer decoder 450 to inhibit the decoding operation. In one embodiment, the signal quality module 442 can be configured to determine a Bit Error Rate (BER) of the decoded base layer data and can selectively enable or inhibit the enhancement layer decoder based on the BER. The signal quality module 442 can also be configured to control a switch 460 that is configured to selectively couple the input signal to the enhancement layer decoder 450.

The signal quality module 442 can be configured to use a fixed threshold or can use a variable threshold. In one embodiment, the signal quality module 442 can be configured to use a variable threshold that is modified, in part, on an error rate of prior decoded enhancement layer data. For example, the signal quality module 442 can initially establish a default threshold and can vary the threshold based on a BER of the decoded enhancement layer data. For example, if the signal quality module 442 determines that the enhancement layer data is to be decoded but the decoded enhancement layer data has a insubstantial BER, the signal quality module 442 may increase the threshold by a predetermined increment to increase the likelihood of decoding enhancement layer data when the enhancement layer decoder is activated. Likewise, the signal quality module 442 can be configured to decrease the threshold if the decoded enhancement layer data has a BER that is substantially lower than an acceptable BER. Of course, the signal quality module 442 can implement other methods for varying the threshold.

In other embodiments, the signal quality module 442 can operate on the input symbols to the base layer decoder 442 and can be configured to determine the probability of successful enhancement layer decoding independent of the decoder implementation. For example, the signal quality module 442 can determine a probability of successful enhancement layer decoding based on a magnitude derived in part from the in phase and quadrature signal components or based on the ratio of the in phase to quadrature signal components. As an example, a scaled magnitude of the in phase or quadrature signal component may indicate that there is a low likelihood of determining the enhancement layer data. An example of such a condition is where either the in phase or quadrature signal component of a 16-QAM or QPSK on QPSK constellation is substantially zero. Because there are no points on the constellation that are near the axes, there is a low probability of decoding the enhancement layer data. Similarly, a ratio of the in phase to quadrature signal components may indicate a deviation from the constellation that can be indicative of a low probability of decoding the enhancement layer data.

The signal quality module 442 may inhibit the enhancement layer decoder 450 to conserve the power that would be expended by the enhancement layer decoder 450 in decoding the received symbols. The signal quality module 442 may also de-energize one or more portions of the enhancement layer decoder 450. The signal quality module 442 can, for example, control a switch that couples the power supply voltage or a supply current to the enhancement layer decoder 450. Alternatively, or in addition, the signal quality module 442 can selectively couple or inhibit a clock signal (not shown) that controls the operation of the enhancement layer decoder 450. The clock signal for the enhancement layer decoder can be, for example, logically AND with an enable signal from the signal quality module 442. In circuits implemented in CMOS, the absence of a clock signal substantially eliminates power consumption by the circuit. Other inhibiting techniques can be used to conserve power when the enhancement layer decoder 450 is inhibited.

If the signal quality module 442 determines that the probability of successful enhancement layer decoding is sufficiently great, the signal quality module 442 can enable the enhancement layer decoder 450 and can control the switch 460 to selectively couple the input signal to the enhancement layer decoder 450.

The enhancement layer decoder 450 can operate on the output of the demodulator 420 and can decode the hierarchically coded symbols to recover the enhancement layer data. The output of the base layer decoder 440 and the enhancement layer decoder 450 can be coupled to a combiner 470 that is configured to output only the output from the base layer decoder 440 when operation of the enhancement layer decoder 450 is inhibited. If data is output from both the base layer decode and the enhancement layer decoder 450, the combiner 470 can be configured to output both recovered data streams. For example, the combiner 470 can be configured to output the base layer and enhancement layer data in parallel, or can be configured to output the data serially according to a predetermined interlacing process.

In another embodiment, the enhancement layer decoder 450 decodes only the enhancement layer data and the base layer decoder 440 is used to recover the base layer data. In such an embodiment, the signal quality module 442 controls the switch to selectively couple the output of the enhancement layer decoder 450 or the base layer decoder 440 to the output of the hierarchical decoder module 430 as the corresponding data is decoded.

The signal quality module 442 can be configured to enable or inhibit the operation of the enhancement layer decoder 450 for the same symbols being operated on by the base layer decoder 440 or some other temporally correlated symbols.

For example, the demodulator 420 can be configured to store a predetermined number of symbols in a data buffer (not shown). The base layer decoder 440 can operate on the buffered data and the signal quality module 442 can determine whether to enable or inhibit the enhancement layer decoder 450 based on a probability of successful decoding. If the signal quality module 442 enables the enhancement layer decoder 450, the enhancement layer decoder 450 can operate on the same data stored in the data buffer of the demodulator 420.

In another embodiment, the base layer decoder 440 can be configured to decode the received symbols from the demodulator 420 and the signal quality module 442 can determine whether to enable or inhibit the enhancement layer decoder 450 for some predetermined duration in the future. For example, the received symbols may be received in blocks and the base layer decoder 440 can decode all blocks. However, the signal quality module 442 can determine if the enhancement layer decoder 450 is to be enabled or inhibited for the next received block or some predetermined number of blocks. The signal quality module 442 need not make a decision on each data block. For example, the enhancement layer decoder 450 can be inhibited for a duration of more than one data block.

Figure 5:
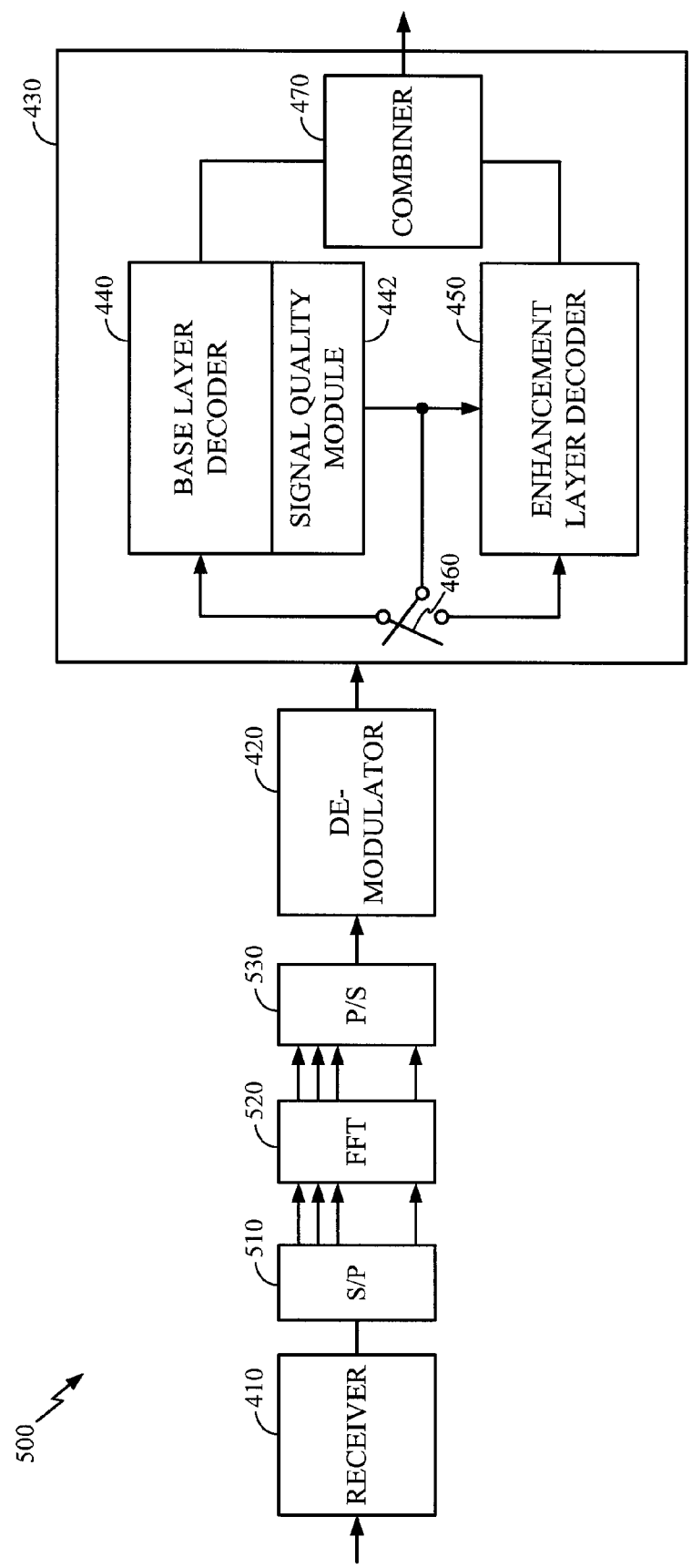
FIG. 5 is a functional block diagram of an embodiment of a receiver configured for operation in a hierarchical modulation system.

FIG. 5 is another functional block diagram of a receiver 500 configured for power savings in a hierarchically coded modulation communication system. The receiver 500 embodiment of FIG. 5 can be used, for example, with the transmitter embodiment shown in FIG. 3.

The receiver 500 includes a receiver module 410 that receives the hierarchically modulated signals and converts the signals to baseband signals. The output of the receiver module 410 can be coupled to a serial to parallel converter 510 that is configured to convert a serial OFDM symbol stream to parallel streams. The output of the serial to parallel converter 510 is coupled to a transform module, which can be a Fast Fourier Transform (FFT) module 520 configured to transform the parallel OFDM symbols into the respective orthogonal subcarriers of the frequency domain.

The output of the FFT module 520 can be couple to a parallel to serial converter 530 that converts the parallel frequency components, or only those frequency component that map to the particular receiver 500, to a demodulator 420. The demodulator 420 operates to demodulate the received symbols and couples the symbols to the hierarchical decoder module 430, that operates as described in FIG. 4.

As discussed previously, the received signals can be encoded according to any one of a variety of encoding processes. Each of the encoding processes has a corresponding decoder process that is implemented in the base layer or enhancement layer decoders.

FIGS. 6A-6D provide functional block diagrams of embodiments of hierarchical decoder modules 430 implementing different decoder types. In a first embodiment, shown in FIG. 6A, the wireless communication system performs convolutional encoding on both the base and enhancement layers of the hierarchically modulated signal. The hierarchical decoder module 430 includes Viterbi decoders 610 and 620 to decode the received symbols.

A base layer Viterbi decoder 610 is used to decode the convolutional encoded base layer symbols. A decoder metric module 612, that can be a portion of the base layer Viterbi decoder 610, can monitor the number or rate of corrections performed by the base layer Viterbi decoder 610 and generate a probability of successful enhancement layer decoding based on the metric. For example, the decoder metric module 612 can monitor a metric in excess of a minimum length through a decoding trellis. The decoder metric module 612 can normalize the metric in terms of the minimum length and can determine a rate over a predetermined number of symbols. The decoder metric module 612 can compare the probability of success against a predetermined threshold and inhibit the enhancement layer Viterbi decoder 620 if the probability of success does not exceed the threshold.

Another embodiment of a hierarchical decoder module 430 is shown in FIG. 6B for a wireless communication system that implements turbo coding of the hierarchically modulated signals. The hierarchical decoder module 430 includes a base layer turbo decoder 630 configured to decode the base layer symbols.

A decoder metric module 632 coupled to the base layer turbo decoder 630 can determine a signal metric based on the output from the base layer turbo decoder 630 and can determine a probability of successfully decoding the enhancement layer data based on the signal metric. In one embodiment, the decoder metric module 632 can be configured to determine an energy metric. The decoder metric module 632 can determine the energy metric by multiplying each of the decoded base layer bits with the corresponding log likelihood ratio from input of the base layer turbo decoder 630. The decoder metric module can then calculate a sum of a predetermined number of weighted base layer bits. For example, the decoder metric module 632 can be configured to determine a sum corresponding to a sliding window of most recent decoded base layer bits. The decoder metric module 632 can compare the energy metric to a predetermined threshold and determine a probability of successfully decoding the enhancement layer data based on the comparison.

In another embodiment, the decoder metric module 632 can be configured to determine an uncoded BER. The decoder metric module 632 can be configured to multiply each of the decoded base layer bits with the sign bit of the corresponding log likelihood ratio. The decoder metric module 632 can determine the uncoded BER by summing a predetermined number of scaled base layer bits. The decoder metric module 632 can compare the uncoded BER to a predetermined threshold and determine a probability of successfully decoding the enhancement layer data based on the comparison.

The internal structure of a turbo decoder performs multiple decoder passes in an attempt to successfully decode the input symbols. A decoder metric module 632 coupled to the base layer turbo decoder 630 can monitor the number of decoder passes that are used in decoding the base layer data. The decoder metric module 632 can determine a probability of successfully decoding the enhancement layer data based on the number of passes or a metric based on the number of passes. The decoder metric module 632 can compare the probability against a predetermined threshold and inhibit the enhancement layer turbo decoder 640 if the probability does not exceed the threshold.

Another embodiment of a hierarchical decoder module 430 is shown in FIG. 6C for a wireless communication system that implements CRC and block coding as shown in FIG. 2C. The hierarchical decoder module 430 includes a base layer decoder having a base layer CRC module 650 coupled to a base layer block decoder 654. An enhancement layer decoder similarly includes an enhancement layer CRC module 660 and an enhancement layer block decoder 662.

The hierarchical decoder module 430 includes a base layer CRC module 650 that is used to verify the CRC of the rows of received data. An inability to verify a CRC value indicates an error in the received data. A failed CRC counter 652 can be coupled to the base layer CRC module 650 to monitor the number of rows of data for which the CRC fails. The failed CRC counter 652 can be configured to monitor the accumulation of failed CRC checks occurring in a predetermined number of rows of data. The failed CRC counter 652 can compare the number of failed CRC checks against a predetermined threshold and can inhibit the enhancement layer decoder based if the number exceeds the threshold.

Additionally, the failed CRC counter can control a switch 656 that selectively couples the received signals to a base layer block decoder 654 that can block decode the received signals using the block coding rows appended to the data rows, as shown in FIG. 2C.

Thus, the failed CRC counter 652 may use the same error control mechanism that determines if the base layer block decoder 654 is used to determine if the enhancement layer decoder is to be inhibited. For example, the failed CRC counter 652 can determine if the base layer block decoder 654 is needed to recover the data from the received base layer signals. If the base layer block decoder is needed to recover the base layer data, there is a low likelihood that the enhancement layer data can be successfully decoded. Thus, the decision to use the base layer block decoder 654 can be used as the decision to inhibit the enhancement layer decoder.

The previous embodiments of the hierarchical decoder module 430 have shown the base layer decoder in parallel with the enhancement layer decoder. However, such a configuration is not a requirement. FIG. 6D shows a functional block diagram of an embodiment of a hierarchical decoder module 430 having a base layer decoder 440 in series with the enhancement layer decoder 450. The base layer decoder 440 is coupled to a signal quality module 442 that determines, based on the base layer decoding, whether the enhancement layer decoder is to be enabled or inhibited. In a series configuration, the enhancement layer decoder 450 can be configured to decode only the enhancement layer data and is not required to decode the base layer data. If the enhancement layer decoder 450 is inhibited, the output from the hierarchical decoder module 430 is the base layer data.

Figure 7:
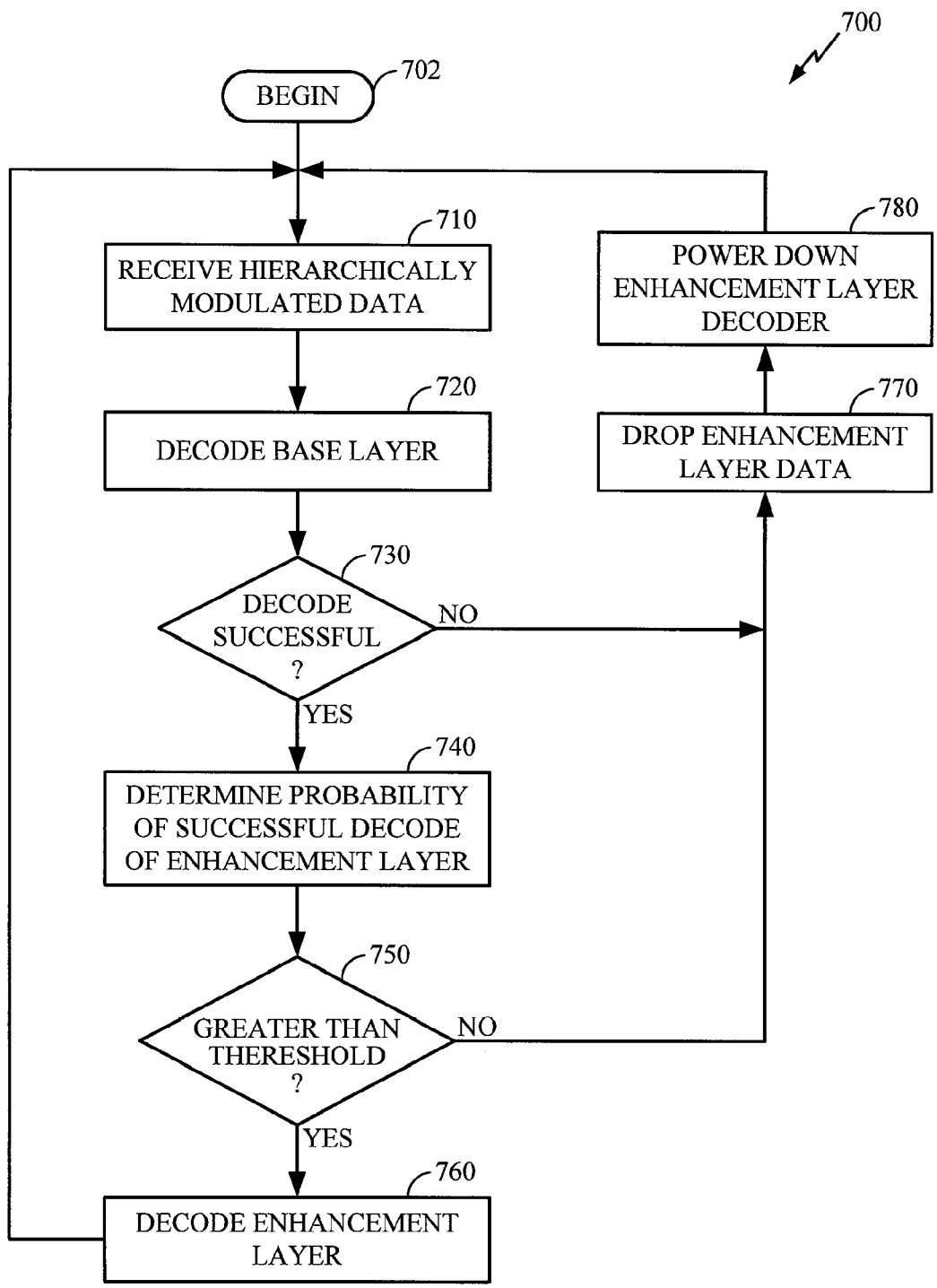
FIG. 7 is a flowchart of an embodiment of a method of power savings in a receiver configured for hierarchical modulation.

FIG. 7 is a flowchart of an embodiment of a method 700 of power savings in a hierarchically coded modulation communication system. The method 700 can be performed, for example, by a receiver in the user terminal in communication with the wireless communication system shown in FIG. 1.

The method 700 begins at block 702. The user terminal proceeds to block 710 and receives the hierarchically coded modulated signals. The user terminal proceeds to block 720 and decodes the base layer data from the received signals.

The user terminal proceeds to decision block 730 and determines if the base layer decoding was successful. If not, there is not need to attempt to decode the enhancement layer. The user terminal proceeds to block 770.

Returning to decision block 730, if the user terminal determines that the base layer data was successfully decoded, the user terminal proceeds to block 740 where the user terminal determines the probability of successful decode of the enhancement layer data. The user terminal can use, for example, an error control mechanism of the base layer decoder to determine the probability of success. In other embodiments, the user terminal can determine the probability based on the ratio of the power level of the enhancement layer relative to the base layer power level The user terminal proceeds to decision block 750 and determines if the probability of successfully decoding the enhancement layer data is greater than a predetermined threshold. If the probability is greater than or equal to the predetermined threshold, depending on the embodiment, the user terminal proceeds to block 760 and decodes the enhancement layer data. The user terminal proceeds from block 760 back to block 710 to receive the next hierarchically coded modulated data.

Returning to decision block 750, if the probability of success does not exceed the predetermined threshold, the user terminal proceeds to block 770. At block 770, the user terminal drops the enhancement layer data. In an embodiment, the user terminal drops the enhancement layer data corresponding to the base layer data from which the probability was determined. In other embodiments, the user terminal drops some other temporally correlated enhancement layer data. For example, the user terminal may drop enhancement layer data for a predetermined duration. In one embodiment, the user terminal may drop the enhancement layer data for one or more predetermined block or packet size.

The user terminal proceeds to block 780, where the user terminal may optionally power down the enhancement layer decoder. The user terminal may, for example, decouple a power supply or current from the enhancement layer decoder, or the user terminal may inhibit a clock signal of the enhancement layer decoder. Of course, the user terminal may implement some other power saving technique.

Methods and apparatus have been disclosed to allow a receiver to conserve power in a hierarchically coded modulation communication system. The receiver can receive a signal having a hierarchically coded base layer signal and enhancement layer signal. The receiver can demodulate and decode the base layer signal. The receiver can determine a probability of successful decoding of the enhancement layer data, and can determine the probability of success based in part on an error control mechanism of the base layer decoder. The receiver can then determine whether to enable or inhibit the enhancement layer decoder based on the probability of success. For low probabilities of success, the receiver can inhibit the enhancement layer decoder and power down or otherwise disable a portion or the entire enhancement layer decoder to further conserve power.

The various illustrative logical blocks, modules, and circuits described in connection with the embodiments disclosed herein may be implemented or performed with a general purpose processor, a digital signal processor (DSP), a Reduced Instruction Set Computer (RISC) processor, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

A software module may reside in RAM memory, flash memory, non-volatile memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A method for controlling a decoder, comprising:
   receiving, at a receiver module, a signal modulated by a hierarchically coded signal having base layer data and enhancement layer data;
   demodulating, at a demodulator, the signal to recover the hierarchically coded signal;
   determining based at least in part on decoding a base layer of the hierarchically coded signal, using a signal quality module, a signal quality metric associated with the hierarchically coded signal, wherein the signal quality metric is generated during decoding of the base layer to indicate a probability of successfully decoding the enhancement layer data; and
   inhibiting, using the signal quality module, an enhancement layer decoder to conserve power consumption based on the signal quality metric generated during decoding of the base layer, wherein inhibiting the enhancement layer decoder inhibits decoding of received symbols of an enhancement layer of the hierarchically coded signal while a base layer decoder continues to decode received symbols of the base layer of the hierarchically coded signal.

2. The method of claim 1, wherein determining the signal quality metric comprises determining a signal metric based in part on magnitudes of in-phase and quadrature signal components of the hierarchically coded signal.

3. The method of claim 1, wherein determining the signal quality metric comprises determining a signal metric based in part on a ratio of in-phase and quadrature signal components of the hierarchically coded signal.

4. The method of claim 1, wherein the signal quality metric associated with the hierarchically coded signal indicates a condition in which in-phase and quadrature signal components of a 16 Quadrature Amplitude Modulated (QAM) hierarchically coded signal or Quadrature Phase Shift Keyed (QPSK) on a QPSK constellation is substantially zero.

5. The method of claim 1, wherein controlling the enhancement layer decoder further comprises inhibiting the clock signal that controls the enhancement layer decoder.

6. The method of claim 1, wherein inhibiting the enhancement layer decoder comprises inhibiting a clock signal coupled to the enhancement layer decoder that controls the enhancement layer decoder, and wherein conserving power consumption comprises eliminating power consumption of the enhancement layer decoder.

7. A wireless device, comprising:
   a receiver module configured to receive a signal modulated by a hierarchically coded signal having base layer data and enhancement layer data;

a demodulator configured to demodulate the signal to recover the hierarchically coded signal; and a signal quality module configured to:

determine, based at least in part on decoding a base layer of the hierarchically coded signal, a signal quality metric associated with the hierarchically coded signal, wherein the signal quality metric is generated during decoding of the base layer to indicate a probability of successfully decoding the enhancement layer data; and inhibit an enhancement layer decoder to conserve power consumption based on the signal quality metric generated during decoding of the base layer, wherein the signal quality module is configured to inhibit the enhancement layer decoder to inhibit decoding of received symbols of an enhancement layer of the hierarchically coded signal while a base layer decoder continues to decode received symbols of the base layer of the hierarchically coded.

8. The wireless device of claim 7, wherein determining the signal quality metric comprises determining a signal metric based in part on magnitudes of in-phase and quadrature signal components of the hierarchically coded signal.

9. The wireless device of claim 7, wherein determining the signal quality metric comprises determining a signal metric based in part on a ratio of in-phase and quadrature signal components of the hierarchically coded signal.

10. The wireless device of claim 7, wherein the signal quality module is configured to inhibit the enhancement layer decoder at least in part by inhibiting a clock signal coupled to the enhancement layer decoder that controls the enhancement layer decoder, and wherein conserving power consumption comprises eliminating power consumption of the enhanced layer decoder.

11. A wireless device, comprising:

means for receiving a signal modulated by a hierarchically coded signal having base layer data and enhancement layer data;

means for demodulating the signal to recover the hierarchically coded signal;

means for determining, based at least in part on decoding a base layer of the hierarchically coded signal, a signal quality metric associated with the hierarchically coded signal, wherein the signal quality metric is generated during decoding of the base layer to indicate a probability of successfully decoding the enhancement layer data; and means for inhibiting an enhancement layer decoder to conserve power consumption based on the signal quality metric generated during decoding of the base layer, wherein the means for inhibiting the enhancement layer decoder comprises means for inhibiting decoding of received symbols of an enhancement layer of the hierarchically coded signal while a base layer decoder continues to decode received symbols of the base layer of the hierarchically coded signal.

12. The wireless device of claim 11, wherein determining the signal quality metric comprises determining a signal metric based in part on magnitudes of in-phase and quadrature signal components of the hierarchically coded signal.

13. The wireless device of claim 11, wherein determining the signal quality metric comprises determining a signal metric based in part on a ratio of in-phase and quadrature signal components of the hierarchically coded signal.

14. The wireless device of claim 11, wherein the means for inhibiting the enhancement layer decoder comprises means for inhibiting a clock signal coupled to the enhancement layer decoder that controls the enhancement layer decoder, and wherein conserving power consumption comprises eliminating the power consumption of the enhancement layer decoder.

15. A non-transitory computer-readable storage medium, the non-transitory computer-readable storage medium comprising instructions operable to cause a computer to perform operations, comprising:

receiving a signal modulated by a hierarchically coded signal having base layer data and enhancement layer data;

demodulating the signal to recover the hierarchically coded signal;

determining, based at least in part on decoding a base layer of the hierarchically coded signal, a signal quality metric associated with the hierarchically coded signal, wherein the signal quality metric is generated during decoding of the base layer to indicate a probability of successfully decoding the enhancement layer data; and inhibiting an enhancement layer decoder to conserve power consumption based on the signal quality metric generated during decoding of the base layer, wherein inhibiting the enhancement layer decoder comprises inhibiting decoding of received symbols of an enhancement layer of the hierarchically coded signal while a base layer decoder continues to decode received symbols of the base layer of the hierarchically coded signal.

16. The non-transitory computer-readable storage medium of claim 15, wherein determining the signal quality metric comprises determining a signal metric based in part on magnitudes of in-phase and quadrature signal components of the hierarchically coded signal.

17. The non-transitory computer-readable storage medium of claim 15, wherein determining the signal quality metric comprises determining a signal metric based in part on a ratio of in-phase and quadrature signal components of the hierarchically coded signal.

18. The non-transitory computer-readable storage medium of claim 15, wherein the inhibiting the enhancement layer decoder comprises inhibiting a clock signal coupled to the enhancement layer decoder that controls the enhancement layer decoder, and wherein conserving power consumption comprises eliminating the power consumption of the enhancement layer decoder.

* * * * *